(No Model.)

L. A. RICHARDS.
DISK HARROW.

No. 382,731. Patented May 15, 1888.

Witnesses,
Geo. H. Strong
J. H. Trouse

Inventor,
L. A. Richards
By Dewey & Co.
att'ys

UNITED STATES PATENT OFFICE.

LOVELL A. RICHARDS, OF GRAYSON, CALIFORNIA.

DISK HARROW.

SPECIFICATION forming part of Letters Patent No. 382,731, dated May 15, 1888.

Application filed December 8, 1887. Serial No. 257,361. (No model.)

*To all whom it may concern:*

Be it known that I, LOVELL A. RICHARDS, of Grayson, Stanislaus county, State of California, have invented an Improvement in Disk Harrows; and I hereby declare the following to be a clear, full, and exact description of the same.

My invention relates to an improvement in that class of harrows or cultivators which are provided with gangs of oppositely-inclined disks, the inner ends of the shafts of which have abutting bumpers.

My invention consists of an improved bumper to resist lateral thrusts, jointed swivel pins or shafts upon which the inner ends of the disk-bearing shafts may turn, and a connecting-rod and lever by which these inner ends may be adjusted, so as to relieve the main bearing-boxes of strain, together with certain details of construction, all of which will be more fully explained by reference to the accompanying drawings, of which—

Figure 1:
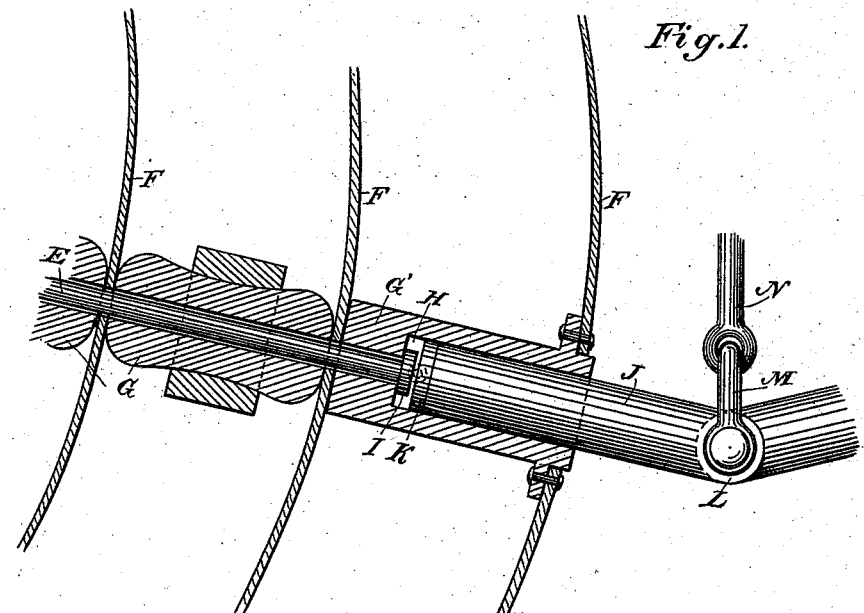
Figure 2:
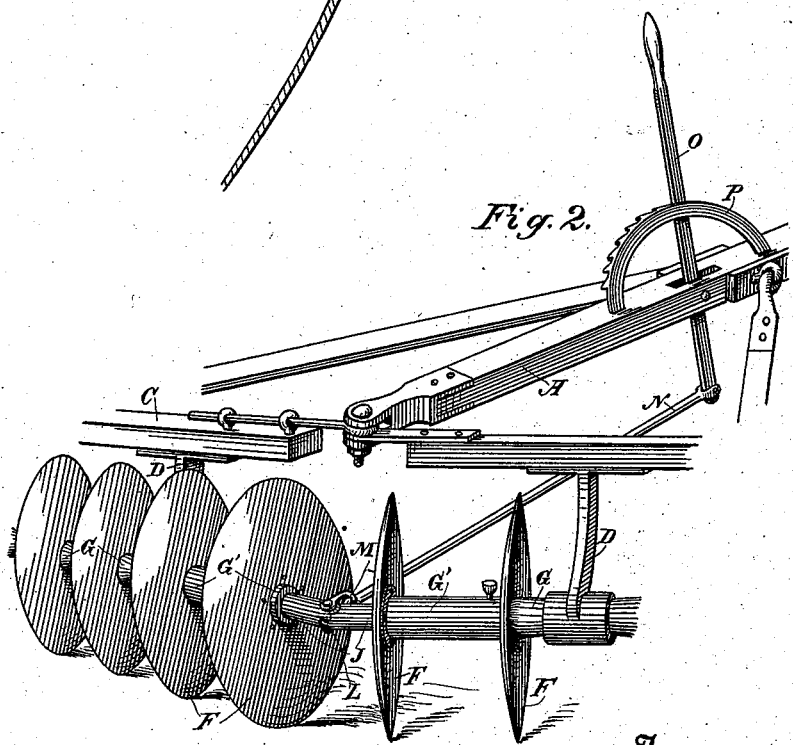

Figure 1 consists of an enlarged view of the meeting ends of the disk-carrying shafts, showing my hinged supplemental swivel-pins, the shafts, and the end of the connecting-link. Fig. 2 is a view showing the connection of these swivel-pins with an operating-lever.

In my former patent, dated September 7, 1886, I have shown a means for producing various adjustments of the disk-gangs; but I found that considerable strain and wear are brought upon the inner shaft-bearing boxes, together with a torsional strain upon the frame-timbers to which they are attached, and this my present invention is designed to relieve and overcome.

A is the tongue to which the team is attached, having at the rear end a forked clip, B, from which the frame-timbers C diverge laterally, as shown. From these frame-timbers hangers D extend outwardly and have journal-boxes in their lower ends, in which the shafts E revolve. Upon these shafts are secured the disks F in a manner similar to that shown and described in my former application for patent. The shafts E have sleeves G, which slip over them to separate the disks a sufficient distance, and by means of which they are clamped or secured in their proper places.

The sleeves G' upon the inner ends of the shafts E have holes H bored into their adjacent ends, and the inner ends of the shafts E have heads or disks I, by which the inner end sleeves, G', are held in place upon the shaft. Short shafts or spindles J are turned to fit accurately into the holes H, and upon their ends adjacent to the disks I are fitted wearing plates or disks K, which, abutting against the disks I, serve to resist the inward thrust caused by the angular position of the disk-shafts when they are at work.

The meeting ends of the two shafts or spindles J are united by a hinge or other joint, L, and a D-link, M, swivels upon a pin which unites the joint-sections at L. To this link is connected a rod, N, which extends forward beneath the tongue A, and is pivoted to the lower end of the lever O, which extends up through the tongue and engages with the curved rack P, by which it may be held in any desired position.

The operation of the device will then be as follows: The rotation of the disks F caused by their travel through the soil will also rotate the shafts E and the sleeves G, the whole acting as a single rigid structure. The spindles or shafts J being hinged together at L, and their ends extending into the holes in the adjacent ends of the inner end sleeves, G', they will serve to resist the thrust toward the center, and the wearing-plates K abutting against the ends of the disks or heads I of the shafts E receive all the heavy wear caused by the operation of the machine. Oil-holes are made through the sleeve G', so that oil may be introduced into the chamber H, and these working parts thus run in oil, and the oil finding its way outward will lubricate the bearing-surface of the shafts J, and will at the same time tend to force any dust or dirt outwardly, instead of allowing it to come in through the joint. This inward thrust of the disks and disk-shafts ordinarily throws a heavy twisting strain upon the inner journal-boxes and the timbers by which they are supported. This strain is resisted and overcome by means of the connecting-rod N and the lever O by throwing the lever O back so as to engage the rack P. The rod N will be drawn forward, and with it the meeting joint L, so that the strain upon the inner journal-boxes will be transferred to the short shafts J, which thus form journal-boxes to divide the strain with those depending from the frame, or they may be made to take it off altogether.

Having thus described my invention, what I claim as new, and desire to secure by Letters Patent, is—

1. A disk-harrow having the oppositely-arranged disk-gangs with the inner ends of their shafts abutting or adjacent to each other, and the short shafts J extending into holes or openings in the inner ends of the disk-shaft sleeves, and having internal wearing-plates, K, substantially as and for the purpose herein described.

2. In a harrow, the short shafts J, having their meeting ends hinged together and their outer ends entering holes in the adjacent meeting ends of the disk shafts or sleeves thereon, in combination with the lever O, and the connecting-rod N, by which this lever is united with the joint of the shafts J, substantially as and for the purpose herein described.

3. The disk harrow with the angularly-supported divergent shafts, the adjacent meeting ends having sleeves bored to receive short shafts J, the meeting ends of which are hinged together, in combination with wearing-plates upon the ends within the sleeves G', to act as thrust-bearings, and oil-holes whereby the chambers within the sleeves may be supplied with a lubricant, substantially as herein described.

In witness whereof I have hereunto set my hand.

LOVELL A. RICHARDS.

Witnesses:
S. H. NOURSE,
H. C. LEE.